(12) United States Patent
Wang et al.

(10) Patent No.: US 12,449,718 B2
(45) Date of Patent: Oct. 21, 2025

(54) DRIVING MECHANISM

(71) Applicant: TDK TAIWAN CORP., Taoyuan (TW)

(72) Inventors: Chao-Hsi Wang, Taoyuan (TW);
Kuen-Wang Tsai, Taoyuan (TW);
Chih-Wei Weng, Taoyuan (TW);
Chao-Chang Hu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 665 days.

(21) Appl. No.: 17/859,306

(22) Filed: Jul. 7, 2022

(65) Prior Publication Data
US 2024/0012234 A1   Jan. 11, 2024

(51) Int. Cl.
*G03B 9/40* (2021.01)
*G03B 9/14* (2021.01)

(52) U.S. Cl.
CPC .................. *G03B 9/40* (2013.01); *G03B 9/14* (2013.01)

(58) Field of Classification Search
CPC ...... G03B 9/40; G03B 9/02; G03B 35/08–12; H04N 23/55; H04N 23/74; G02B 5/005
See application file for complete search history.

(56) References Cited

U.S. PATENT DOCUMENTS

| | | | | |
|---|---|---|---|---|
| 2,869,446 A | * | 1/1959 | Franceschini | G03B 9/08 396/326 |
| 2,922,349 A | * | 1/1960 | Rochwite | G03B 35/10 396/326 |
| 3,774,512 A | * | 11/1973 | Seiden | G03B 35/10 396/510 |
| 5,136,319 A | * | 8/1992 | Ushiro | G03B 35/08 396/326 |
| 7,548,690 B2 | * | 6/2009 | Gomi | G03B 9/08 396/326 |
| 7,625,142 B2 | * | 12/2009 | Fukasawa | G03B 9/24 396/452 |

FOREIGN PATENT DOCUMENTS

KR    2015138749 A   * 12/2015

* cited by examiner

*Primary Examiner* — Leon W Rhodes, Jr.
(74) *Attorney, Agent, or Firm* — MUNCY, GEISSLER, OLDS & LOWE, P.C.

(57) ABSTRACT

A driving mechanism is provided, including a fixed part, a movable part connected to the fixed part, and a driving assembly configured to impel the movable part relative to the fixed part, so that the driving mechanism is switchable between an open state and a closed state. The fixed part has a plurality of holes. When the driving mechanism is in the open state, light propagates through the driving mechanism via the holes, and when the driving mechanism is in the closed state, the holes are blocked by the movable part.

20 Claims, 11 Drawing Sheets

DRIVING MECHANISM

BACKGROUND OF THE INVENTION

Field of the Invention

The present invention relates to a driving mechanism, and, in particular, to a driving mechanism configured to move an optical element.

Description of the Related Art

As technology has advanced, a lot of electronic devices (for example, laptop computers and smartphones) have incorporated the functionality of taking photographs and recording video. These electronic devices have become more commonplace, and have been developed to be more convenient and thin. More and more options are provided for users to choose from.

In some electronic devices, it can be difficult to reduce the size of the shutter or aperture mechanism in a camera module. Therefore, addressing the aforementioned problems has become a challenge.

BRIEF SUMMARY OF THE INVENTION

An embodiment of the present invention provides a driving mechanism that includes a fixed part, a movable part connected to the fixed part, and a driving assembly configured to impel the movable part relative to the fixed part, so that the driving mechanism is switchable between an open state and a closed state. The fixed part has a plurality of holes. When the driving mechanism is in the open state, light propagates through the driving mechanism via the holes, and when the driving mechanism is in the closed state, the holes are blocked by the movable part.

In some embodiments, the driving assembly has a coil and a magnet received in the fixed part, and when a current signal is applied to the coil, the coil and the magnet generate an electromagnetic force to impel the movable part relative to the fixed part.

In some embodiments, the driving mechanism further includes a circuit board, a bobbin, and a plurality of conductive terminals, wherein the coil is wound on the bobbin, and the conductive terminals are disposed on the bobbin for electrically connecting the coil to the circuit board.

In some embodiments, the driving mechanism further includes a rotary member, the movable part having a first optical element and a second optical element, wherein the magnet is disposed on the rotary member, and when the current signal is applied to the coil, the rotary member is driven by electromagnetic force to rotate relative to the fixed part, and the first and second optical elements are forced by the rotary member to move in opposite directions.

In some embodiments, the driving mechanism has a rectangular structure, and the first and second optical elements are forced to move relative to the fixed part along the long axis of the driving mechanism.

In some embodiments, the length of the first optical element along the long axis is greater than the length of the second optical element along the long axis.

In some embodiments, the first optical element has a first opening, and the second optical element has a second opening, wherein when the driving mechanism is in the open state, the first and second openings are aligned to the holes, and when the driving mechanism is in the closed state, the holes are blocked by the first and second optical elements.

In some embodiments, the fixed part has a cover and a base connected to each other, the base has a supporting portion and a rib protruding from the supporting portion, and the rib contacts and supports the first optical element.

In some embodiments, the driving mechanism further including a bobbin, a first yoke, and a second yoke, wherein the coil is wound on the bobbin, and the first and second yokes both have a J-shaped structure extending through the coil and the bobbin.

In some embodiments, the first yoke has a first main body, a first extending portion, and a first bending portion connected between the first main body and the first extending portion, the first main body extends through the bobbin, and the first extending portion is located adjacent to the magnet.

In some embodiments, the first main body and the first extending portion of the first magnetic yoke are situated at different heights in a vertical direction that is perpendicular to the central axis of the coil.

In some embodiments, the second magnetic yoke has a second main body, a second extending portion, and a second bending portion connected between the second main body and the second extending portion, the second main body extends through the bobbin, and the second extending portion is located adjacent to the magnet.

In some embodiments, the second main body and the second extending portion of the second magnetic yoke are situated at different heights in a vertical direction that is perpendicular to the central axis of the coil.

In some embodiments, the first and second main bodies at least partially overlap when viewed in the vertical direction.

In some embodiments, the first extending portion of the first magnetic yoke and the second extending portion of the second magnetic yoke are situated at the same height in a vertical direction that is perpendicular to the central axis of the coil.

In some embodiments, the fixed part has a supporting portion and a recessed portion connected to each other, the movable part is disposed on the supporting portion, and the rotary member, the magnet, the bobbin, the coil, the first yoke, and the second yoke are accommodated in the recessed portion.

In some embodiments, the recessed portion is lower than the bottom surface of the supporting portion in a vertical direction that is perpendicular to the moving direction of the movable part relative to the fixed part.

In some embodiments, the movable part has a first optical element and a second optical element, and the holes includes a first hole, a second hole, and a third hole, wherein the first hole is larger than the second and third holes, and when the driving mechanism is in the closed state, the first hole and the first and second optical elements partially overlap when viewed in a vertical direction.

In some embodiments, the first optical element has a first opening aligned to the second hole, and the second optical element has a second opening aligned to the third hole when the driving mechanism is in the open state.

In some embodiments, the driving mechanism has a rectangular structure, and the fixed part has a cover and a base connected to each other, wherein the driving assembly is received in the base, the cover has a first slot, and the base has a first hook joined in the first slot, wherein the first slot and the first hook are located on the short side of the driving mechanism.

In some embodiments, the cover further has a second slot, and the base further has a second hook located on the long side of the driving mechanism, wherein the second hook is longer than the first hook in a vertical direction that is perpendicular to the moving direction of the movable part relative to the fixed part.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The making and using of the embodiments of the driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
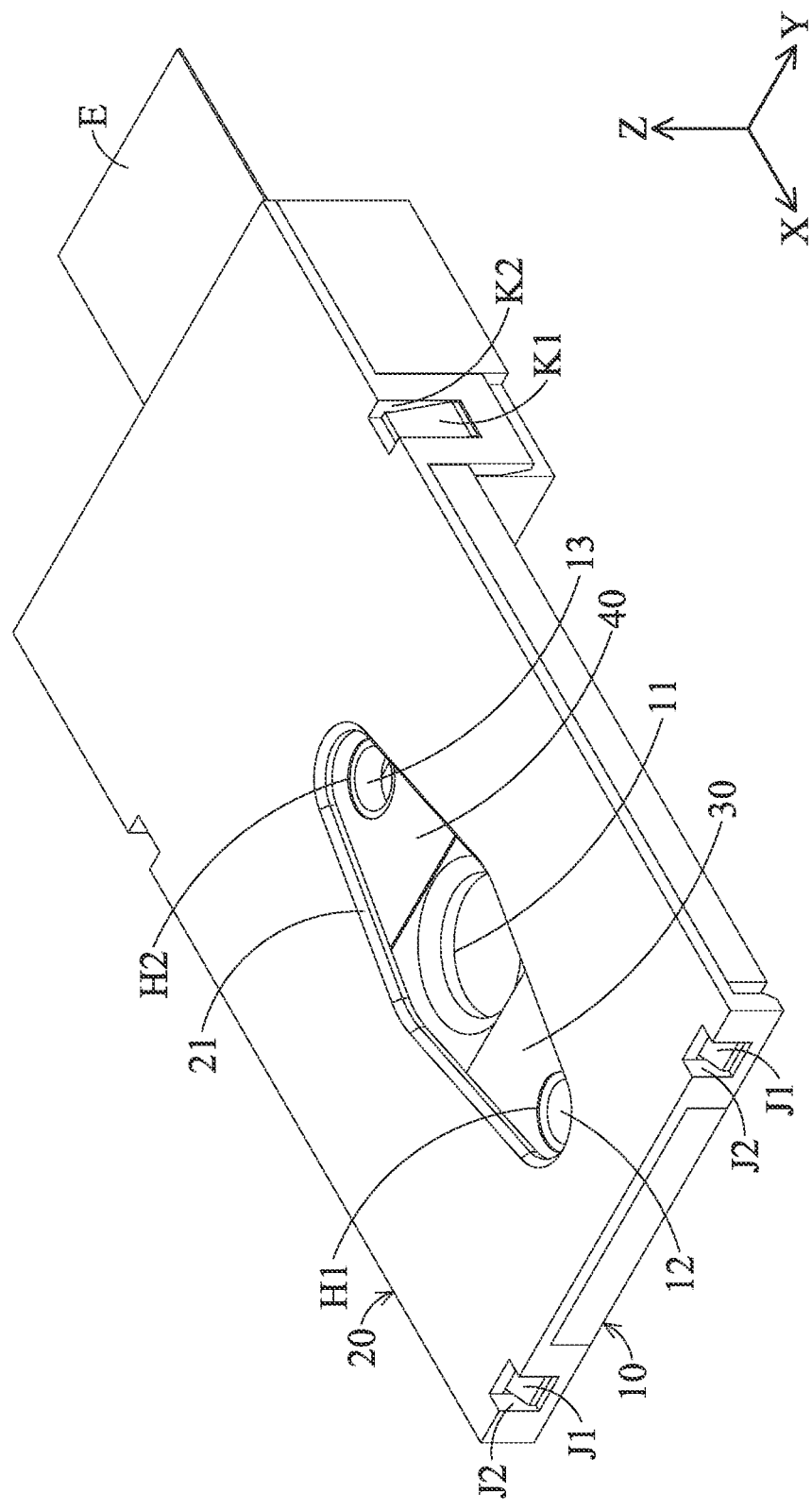
FIG. 1 is a perspective diagram of a driving mechanism 100 in accordance with an embodiment of the invention.
Figure 2:
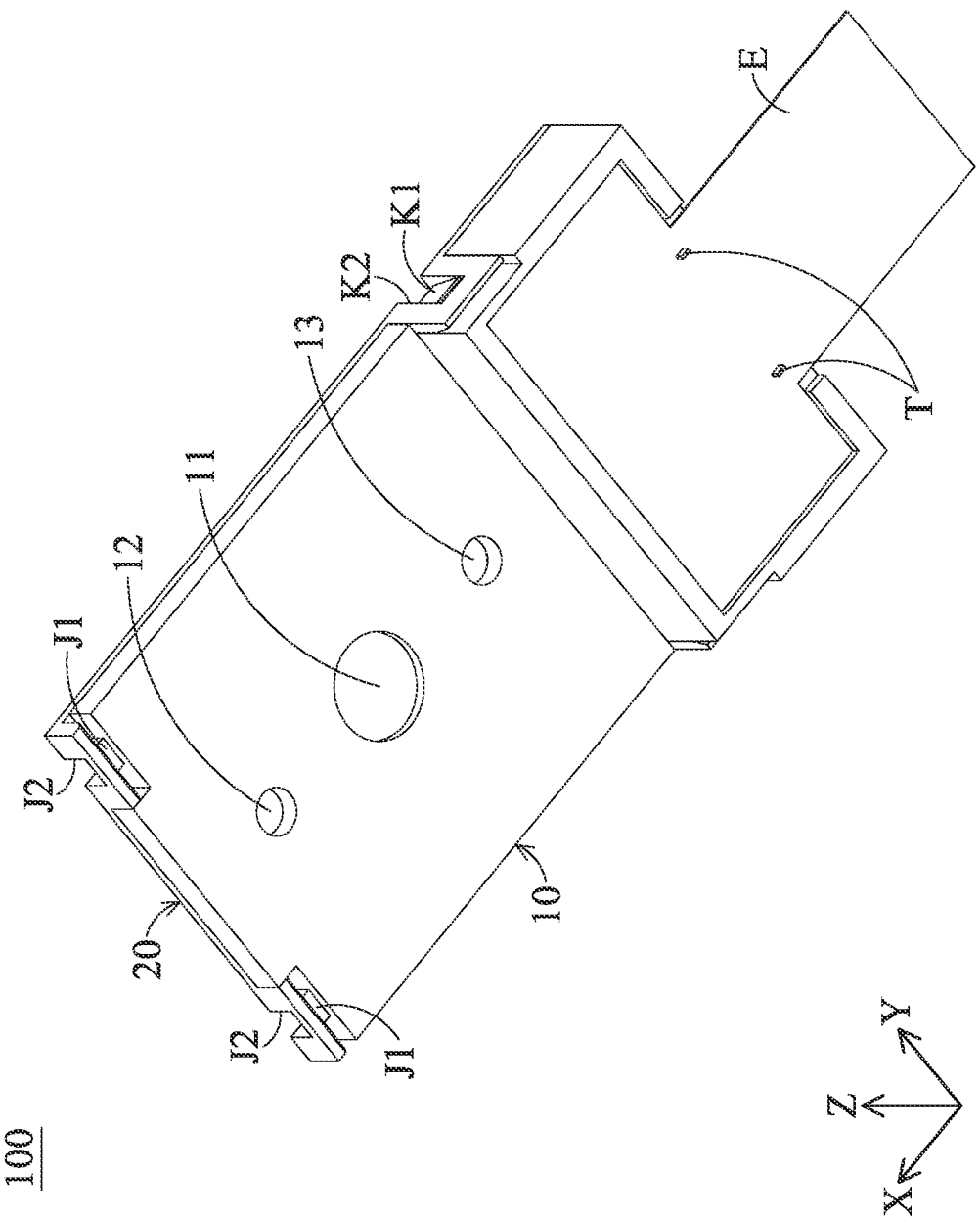
FIG. 2 is another perspective diagram of the driving mechanism 100 in FIG. 1.
Figure 3:
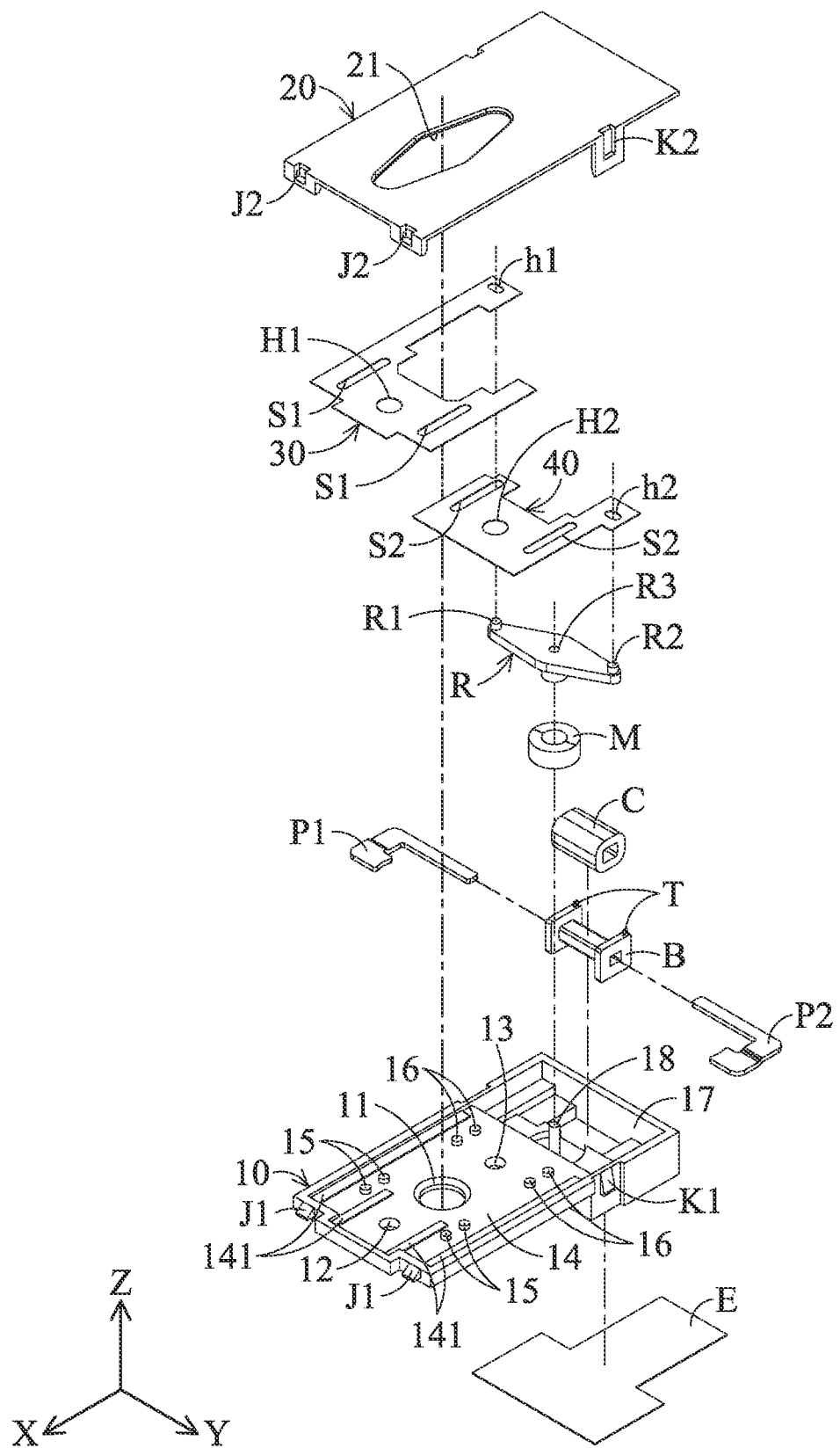
FIG. 3 is an exploded diagram of the driving mechanism 100 in FIG. 1.
Figure 4:
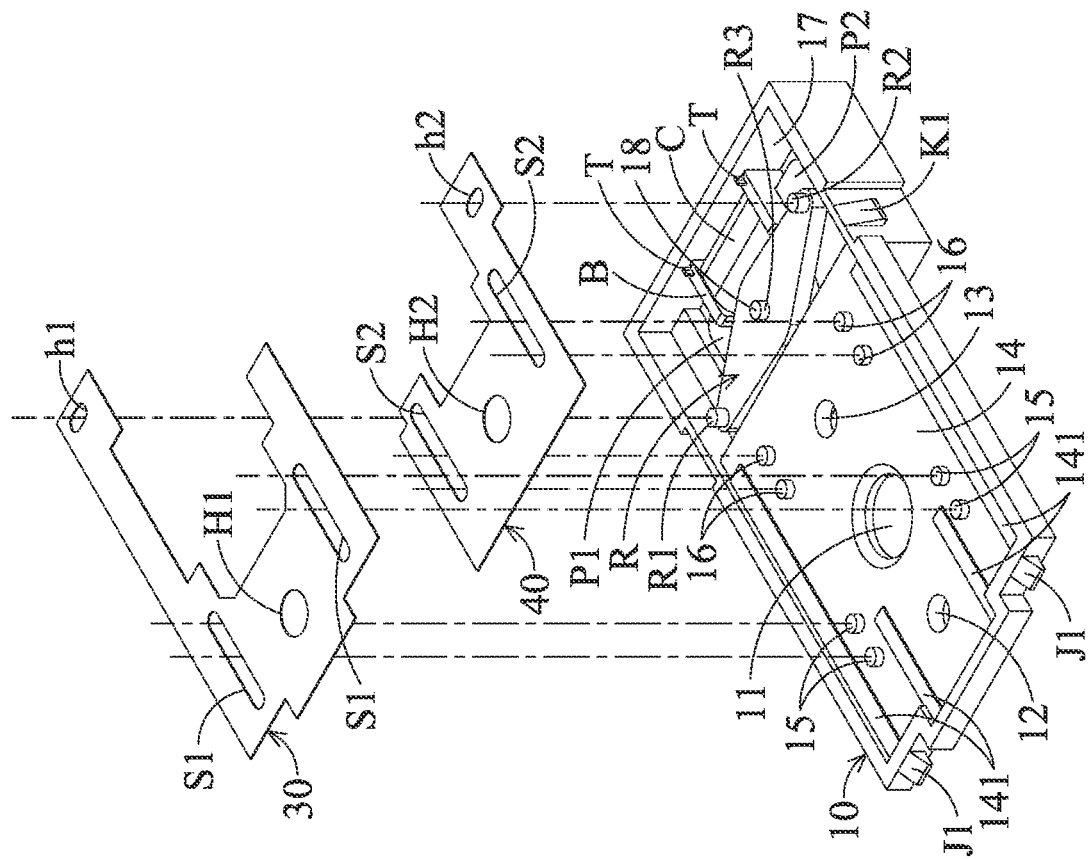
FIG. 4 is an exploded diagram showing the first and second optical elements 30 and 40 before assembled to the base 10.
Figure 5:
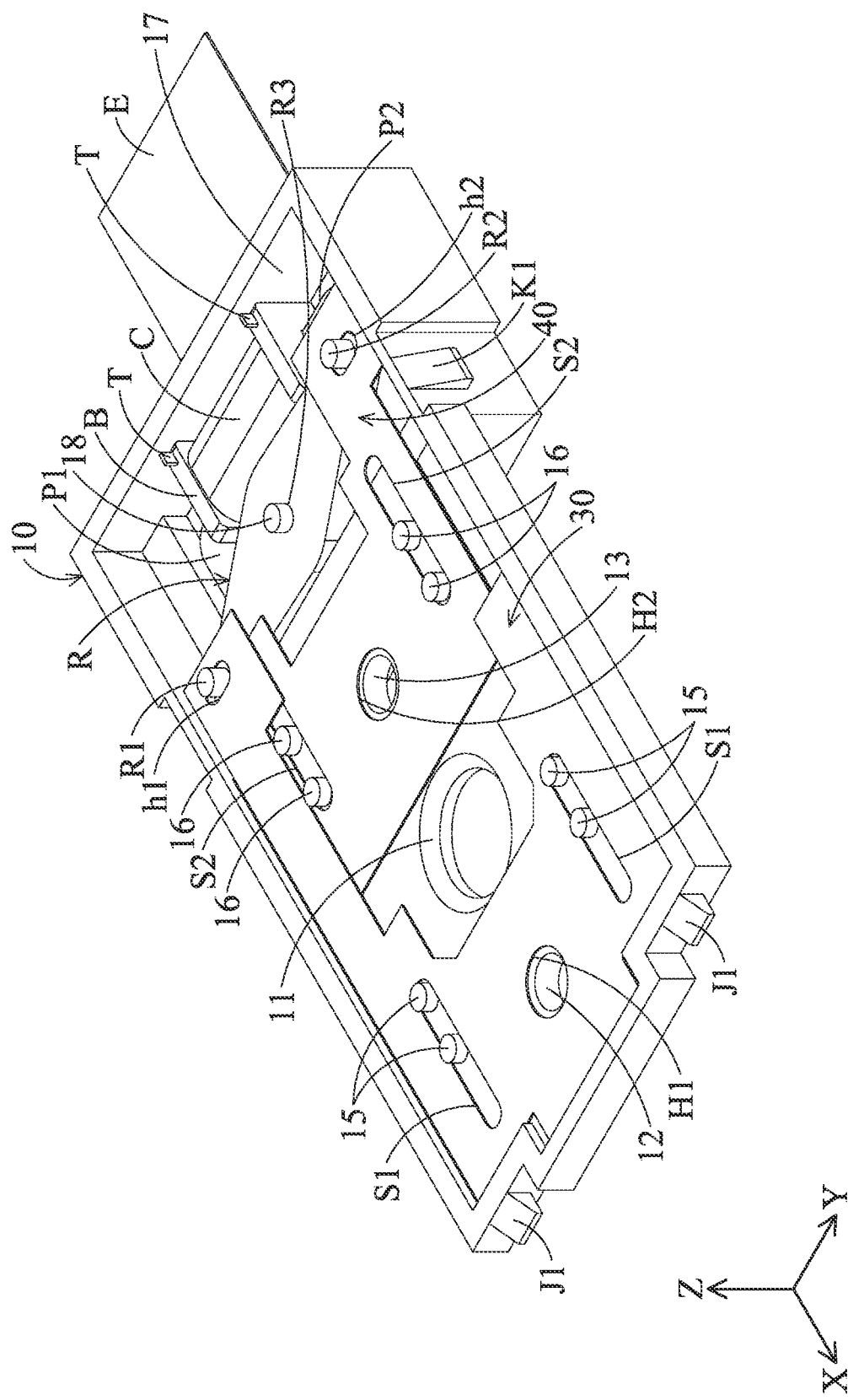
FIG. 5 is a perspective diagram of the driving mechanism 100 in FIG. 1 with the cover 20 omitted.
Figure 6:
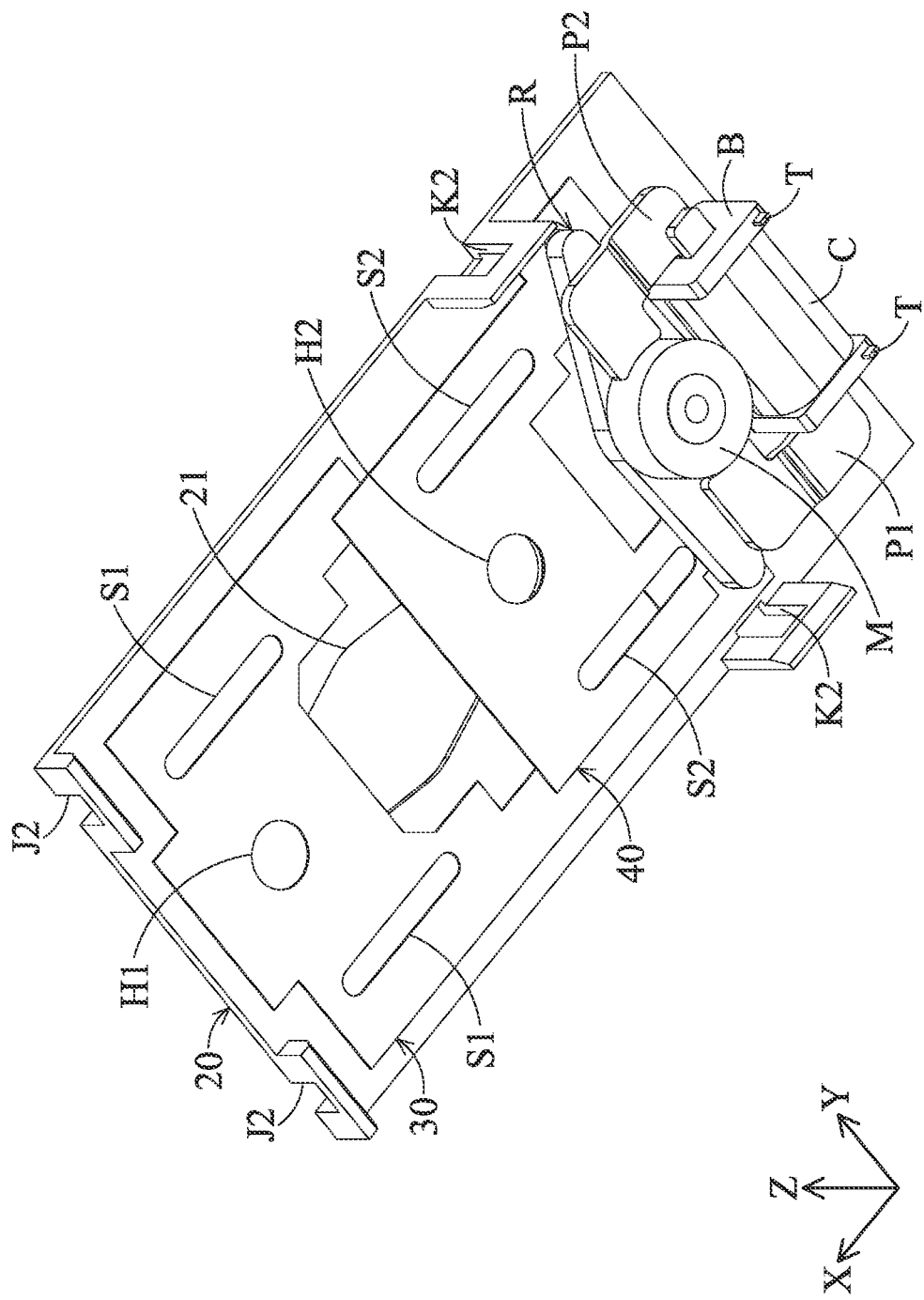
FIG. 6 is a perspective diagram of the driving mechanism 100 in FIG. 2 with the base 10 and the circuit board E omitted.

FIG. 1 is a perspective diagram of a driving mechanism 100 in accordance with an embodiment of the invention. FIG. 2 is another perspective diagram of the driving mechanism 100 in FIG. 1. FIG. 3 is an exploded diagram of the driving mechanism 100 in FIG. 1. FIG. 4 is an exploded diagram showing the first and second optical elements 30 and 40 before assembled to the base 10. FIG. 5 is a perspective diagram of the driving, mechanism 100 in FIG. 1 with the cover 20 omitted. FIG. 6 is a perspective diagram of the driving mechanism 100 in FIG. 2 with the base 10 and the circuit board E omitted.

As shown in FIGS. 1-3, an embodiment of a driving mechanism 100 primarily comprises a base 10, a cover 20, a first optical element 30, a second optical element 40, a rotary member R, a magnet M, a coil C, a first magnetic yoke P1, a second magnetic yoke P2, a bobbin B, and a circuit board E.

The driving mechanism 100 may be a shutter or aperture mechanism of a camera unit that is disposed in an electronic device. Here, the base 10 and the cover 20 constitute a fixed part of the driving mechanism 100, and the first and second optical elements 30 and 40 constitute a movable part of the driving mechanism 100. Moreover, the magnet M and the coil C constitute a driving assembly of FIG. 1 that is disposed in the base 10.

In this embodiment, the coil C is wound on the bobbin B, and several conductive terminals T are disposed on the bobbin B for electrically connecting the coil C to the circuit board E below the base 10. When a current signal is applied from an external circuit through the circuit board E to the coil C, the magnet M and the coil C can generate an electromagnetic force to move the first optical element 30 and the second optical element 40 relative to the base 10 along the X axis.

The magnet M is affixed to the bottom of the rotary member R, and a shaft 18 is formed on the base 10 and extends through a hole R3 of the rotary member R, whereby the rotary member R is hinged to the base 10. Hence, when a current signal is applied from an external circuit through the circuit board E to the coil C, the rotary member R can be driven to rotate relative to the base 10 by the electromagnetic force generated from the magnet M and the coil C. Thus, the first and second optical elements 30 and 40 can be moved relative to the base 10 along the X axis to open or block a first hole 11, a second hole 12, and a third hole 13 on the base 10.

The rectangular base 10 forms a first hook J1 and a second hook K1, and the cover 20 forms a first slot J2 and a second slot K2. The first hook J1 and the first slot J2 are disposed on the short sides of the base 10 and the cover 20 and joined with each other. The second hook K1 and the second slot K2 are disposed on the long sides of the base 10 and the cover 20 and joined with each other.

Specifically, the second hook K1 and the second slot K2 are longer than the first hook J1 and the first slot J2 in the Z direction (vertical direction). Therefore, connection strength between the base 10 and the cover 20 can be enhanced, and the reliability of the driving mechanism 100 can also be improved.

Still referring to FIGS. 1-6, when the driving mechanism 100 is in an open state, the first, second, and third holes 11, 12, and 13 are exposed to an opening 21 of the cover 20, wherein the first hole 11 is situated between the first and second optical elements 30 and 40 in the X direction. It should be noted that a first opening H1 of the first optical element 30 is aligned to the second hole 12, and a second opening H2 of the second optical element 40 is aligned to the third hole 13, so that external light can propagate through the driving mechanism 100 to an image sensor inside the electronic device via the first, second, and third holes 11, 12, and 13.

As shown in FIGS. 3 and 4, a first slot S1, a first hinge hole h1, and the first opening H1 are formed on the first optical element 30. A second slot S2, a second hinge hole h2, and the second opening H2 are formed on the second optical element 40. The rotary member R has a first hinge R1 and a second hinge R2 rotatably received in the first and second hinge holes h1 and h2, whereby the first and second optical elements 30 and 40 are pivotally connected to the rotary member R.

The base 10 has a supporting portion 14 and a recessed portion 17 connected to each other, wherein the first and second optical elements 30 and 40 are movably disposed on the supporting portion 14. Several protrusions 15 and 16 are formed on the supporting portion 14 and extend through the first and second slots S1 and S2. When the rotary member R rotates to impel the first and second optical elements 30 and 40 along the X axis, the protrusions 15 and 16 slide along the first and second slots S1 and S2.

Additionally, at least a rib 141 is formed on the supporting portion 14 to contact and support the first optical element 30. Thus, a gap can be formed between the first and second optical elements 30 and 40 along the Z axis to prevent them from contact with each other.

In this embodiment, the rotary member R, the magnet M, the coil C, the first magnetic yoke P1, the second magnetic yoke P2, and the bobbin B are received in the recessed portion 17, wherein the recessed portion 17 is lower than the bottom surface of the supporting portion 14 in the Z direction. Here, the magnet M has a round structure, and the first and second magnetic yokes P1 and P2 have a J-shaped structure extending through the coil C and the bobbin B.

In FIGS. 3 and 6, each of the first and second magnetic yokes P1 and P2 forms a curved end surface adjacent to the magnet M, thereby improving the magnetic field distribution around the coil C and achieving high efficiency of the driving mechanism 100.

Figure 7:
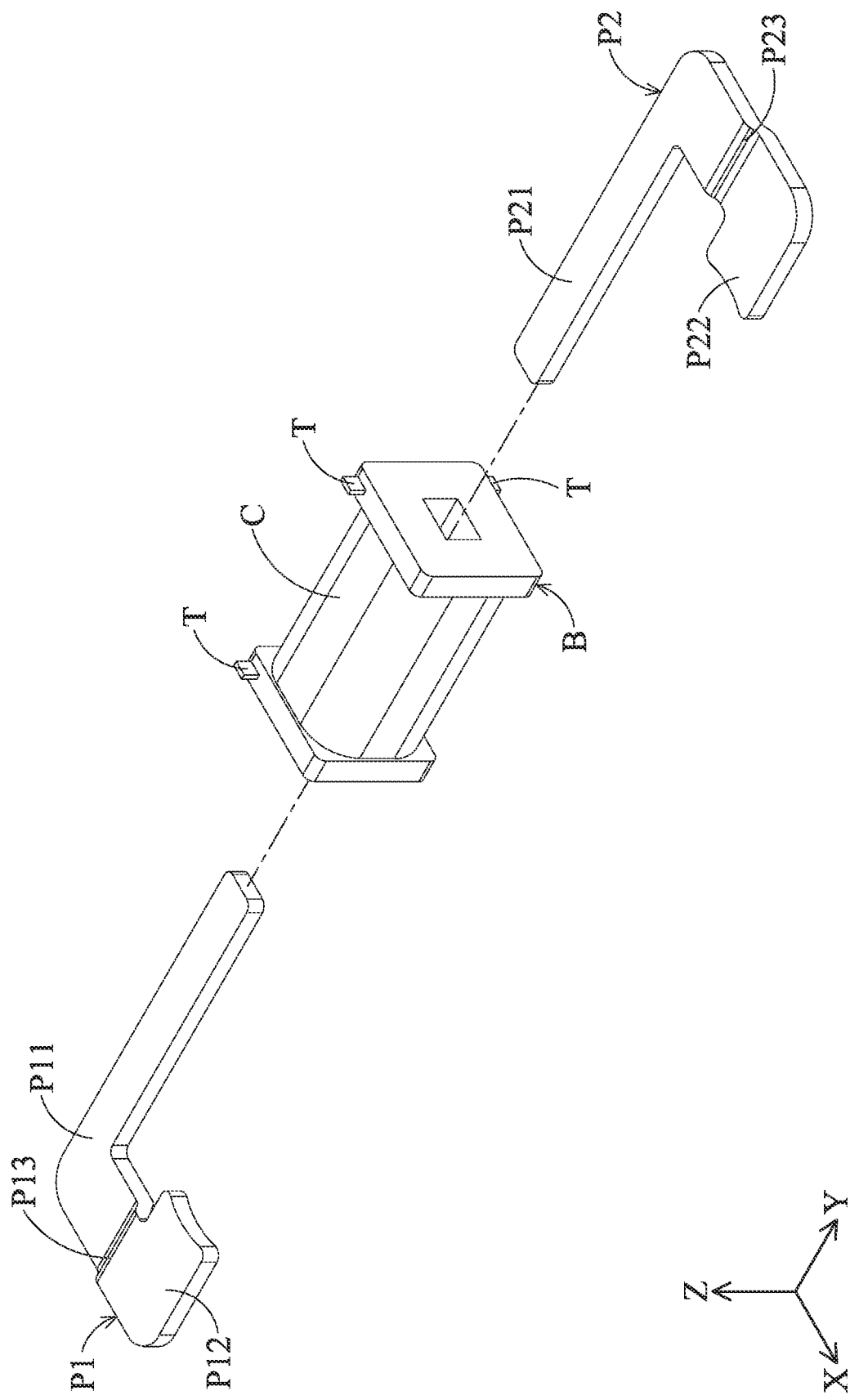
FIG. 7 is an exploded diagram showing the coil C, the bobbin B, and the first and second magnetic yokes P1 and P2.
Figure 8:
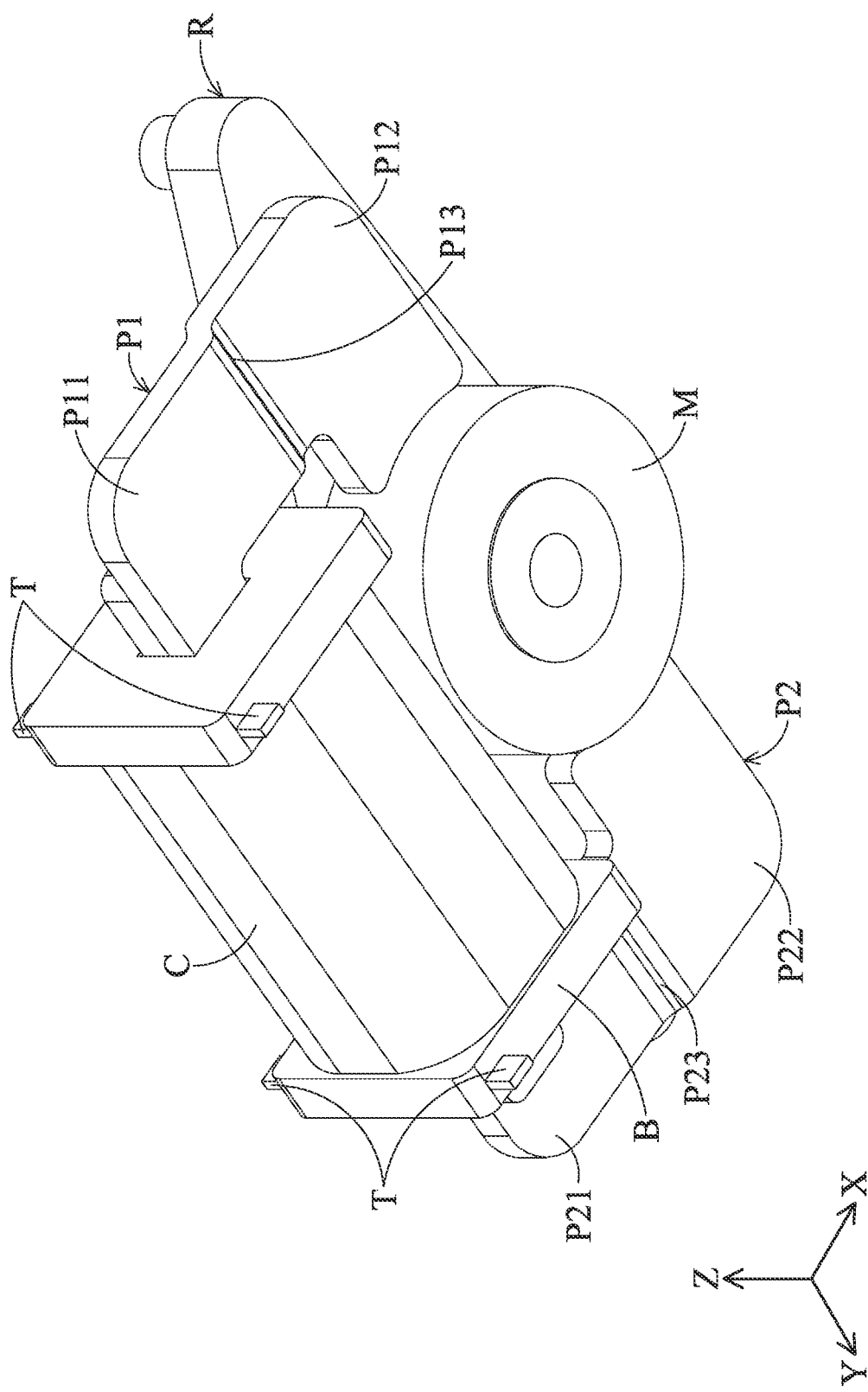
FIG. 8 is a perspective diagram of the rotary member R, the magnet M, the coil C, the bobbin B, and the first and second magnetic yokes P1 and P2 after assembly.
Figure 9:
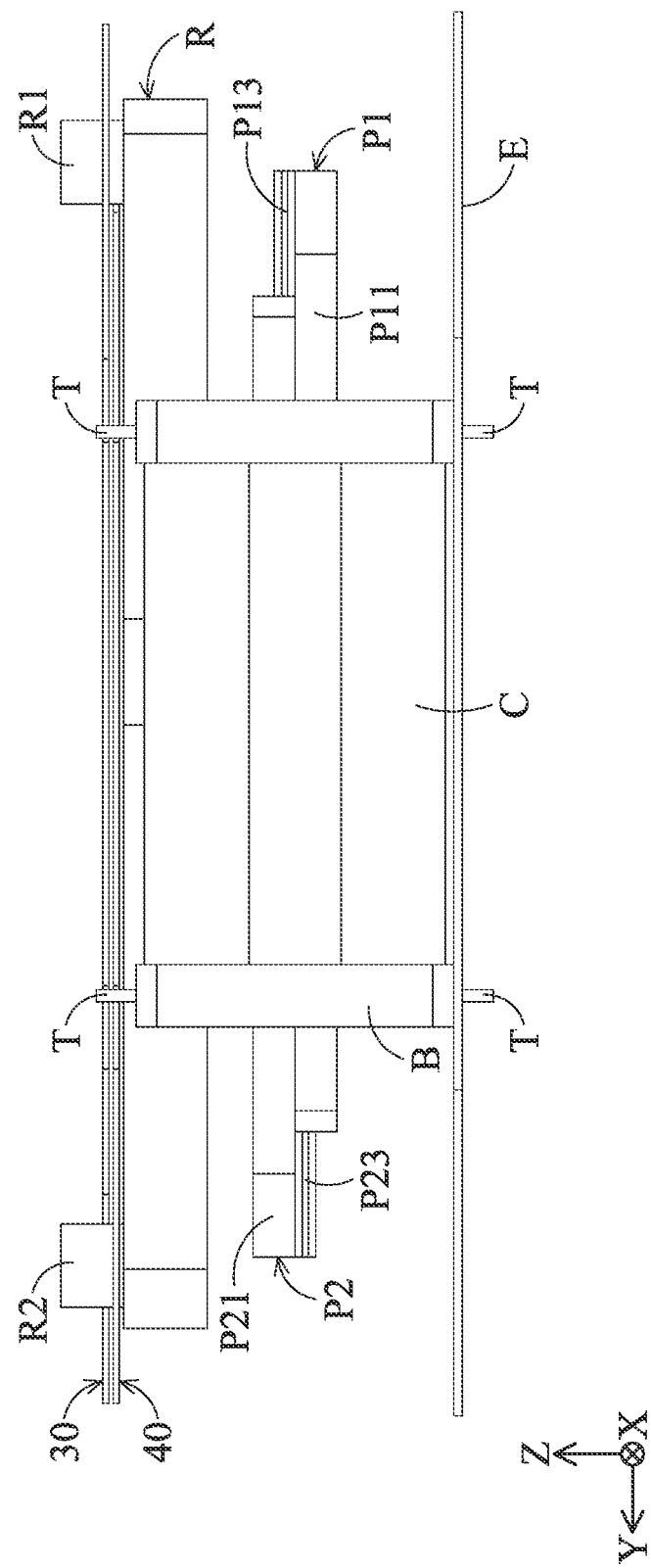
FIG. 9 is a side view of the rotary member R, the magnet M, the coil C, the bobbin B, the circuit board E, and the first and second magnetic yokes P1 and P2 after assembly.
Figure 10:
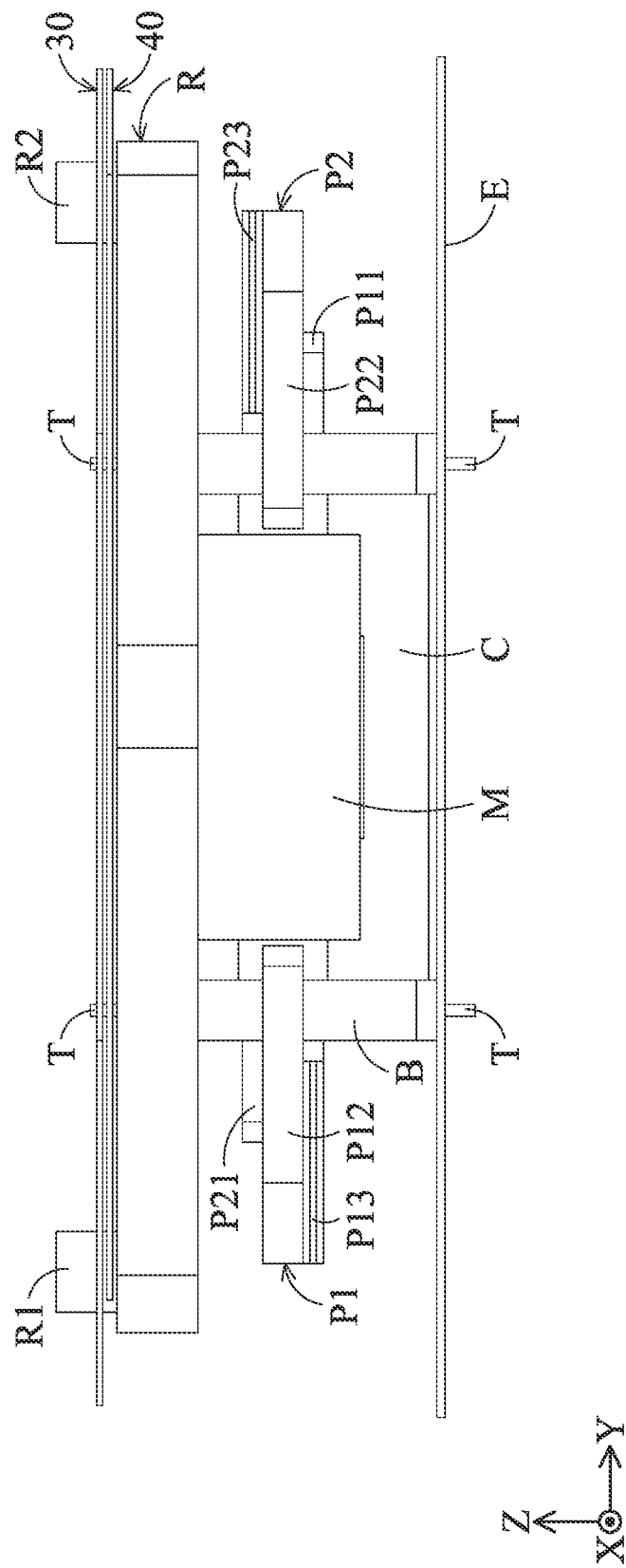
FIG. 10 is another side view of the rotary member R, the magnet M, the coil C, the bobbin B, the circuit board E, and the first and second magnetic yokes P1 and P2 after assembly.

FIG. 7 is an exploded diagram showing the coil C, the bobbin B, and the first and second magnetic yokes P1 and P2. FIG. 8 is a perspective diagram of the rotary member R, the magnet M, the coil C, the bobbin B, and the first and second magnetic yokes P1 and P2 after assembly. FIG. 9 is a side view of the rotary member R, the magnet M, the coil C, the bobbin B, the circuit board E and the first and second magnetic yokes P1 and P2 after assembly. FIG. 10 is another side view of the rotary member R, the magnet M, the coil C, the bobbin B, the circuit board E, and the first and second magnetic yokes P1 and P2 after assembly.

As shown in FIGS. 7-10, the first magnetic yoke P1 has a first main body P11, a first extending portion P12, and a first bending portion P13 connected between the first main body P11 and the first extending portion P12. Similarly, the second magnetic yoke P2 has a second main body P21, a second extending portion P22, and a second bending portion P23 connected between the second main body P21 and the second extending portion P22.

It should be noted that the first main body P11 and the first extending portion P12 of the first magnetic yoke P1 are situated at different heights in the Z direction. Similarly, the second main body P21 and the second extending portion P22 of the second magnetic yoke P2 are situated at different heights in the Z direction. Here, the coil C and the bobbin B define the central axis that is parallel to the Y direction (horizontal direction), wherein the first main body P11 of the first magnetic yoke P1 and the second main body P21 of the second magnetic yoke P2 at least partially overlap when viewed in the Z direction (vertical direction).

During assembly of the driving mechanism 10, the first main body P11 of the first magnetic yoke P1 and the second main body P21 of the second magnetic yoke P2 are inserted through the coil C from opposite sides of the bobbin B. Thus, the first extending portion P12 of the first magnetic yoke P1 and the second extending portion P22 of the second magnetic yoke P2 can be positioned at the same height in the Z direction for improving the magnetic field distribution around the coil C and achieving high efficiency of the driving mechanism 100.

In FIGS. 9 and 10, the first main body P11 of the first magnetic yoke P1 is located below the second main body P21 of the second magnetic yoke P2. Moreover, two pairs of metal conductive terminals T protrude from the top and bottom sides of the plastic bobbin B. In some embodiments, the conductive terminals T may be integrally formed with the bobbin B in one piece by insert molding, thereby simplifying circuit design, enhancing structural strength of the driving mechanism 100, and facilitating miniaturization of the product.

Figure 11:
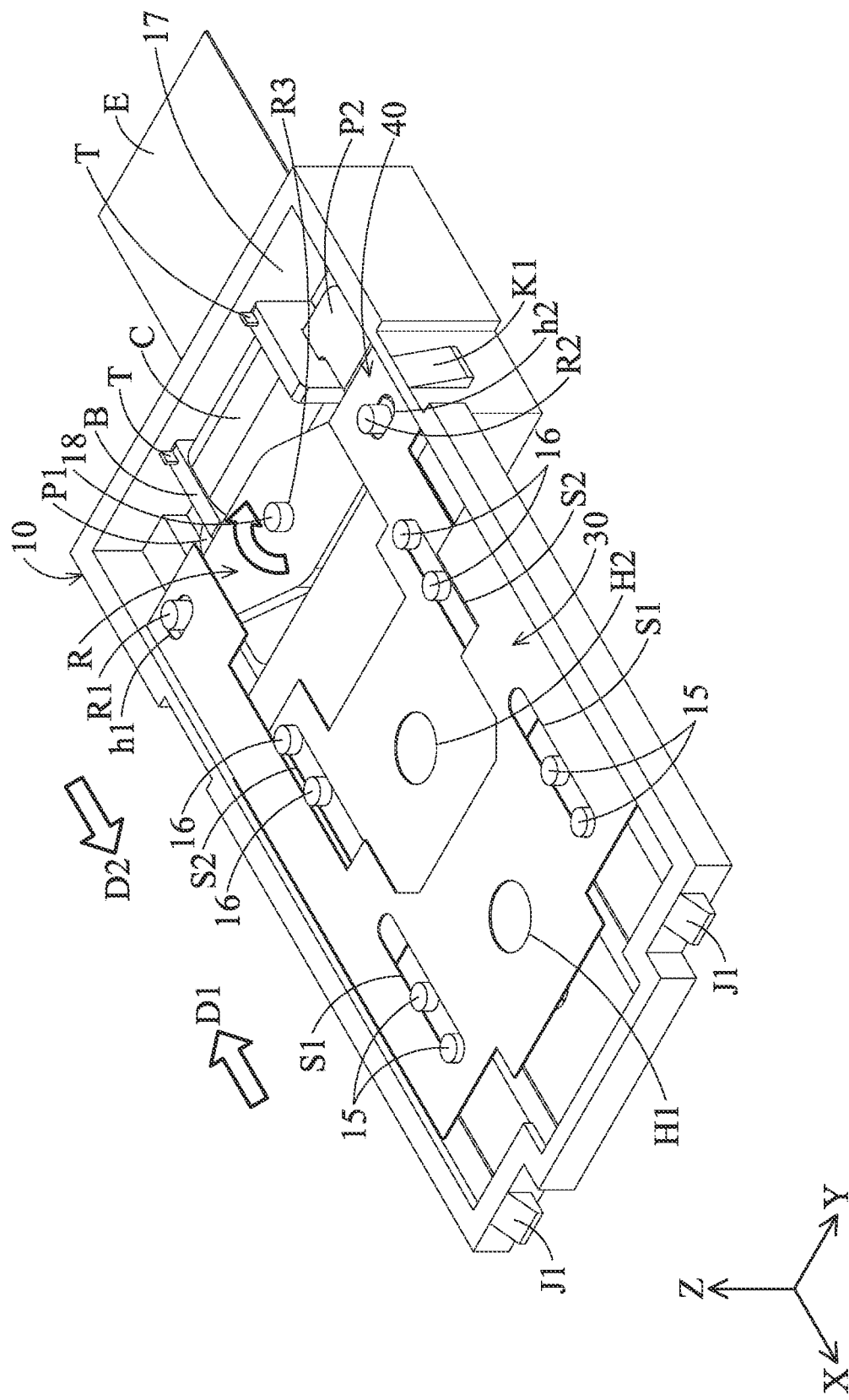
FIG. 11 is a perspective diagram showing the first and second optical elements and 40 when driven by the rotary member R to respectively slide in the −X direction (first direction) and the X direction (second direction).

FIG. 11 is a perspective diagram showing the first and second optical elements 30 and 40 when driven by the rotary member R to respectively slide in the −X direction (first direction) and the X direction (second direction).

As shown in FIG. 11, when a current signal is applied from an external circuit through the circuit board E to the coil C, the rotary member R is driven to rotate relative to the base 10 by the electromagnetic force generated from the magnet M and the coil C. Thus, the first optical element 30 can be forced to move relative to the base 10 in the −X direction (first direction), and the second optical element 40 can be forced to move relative to the base 10 in the X direction (second direction), whereby the first hole 11, the second hole 12, and the third hole 13 are blocked by the first and second optical elements 30 and 40, and the driving mechanism 100 is switched to a closed state.

Still referring to FIG. 11, when the driving mechanism 100 is in the closed state, the first hole 11, the first optical element 30, and the second optical element 40 partially overlap when viewed along the Z axis. Specifically, the first hole 11 is larger than the second hole 12 and the third hole 13. In this embodiment, the driving mechanism 100 has a rectangular structure, and the long axis of the driving mechanism 100 is parallel to the X axis, wherein the first hole 11, the second hole 12, and the third hole 13 are arranged along the long axis of the driving mechanism 100. Hence, the first and second optical elements 30 and 40 can slide relative to the base 10 along the long axis of the driving mechanism 100 to increase the moving distance, wherein the length of the first optical element 30 is greater than the length of the second optical element 40 along the long axis (X axis) of the driving mechanism 100.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A driving mechanism, comprising:
a fixed part, having a plurality of holes;
a movable part, connected to the fixed part; and
a driving assembly, configured to impel the movable part relative to the fixed part, whereby the driving mechanism is switchable between an open state and a closed state;
wherein when the driving mechanism is in the open state, light propagates through the driving mechanism via the holes, and when the driving mechanism is in the closed state, the holes are blocked by the movable part;
wherein the movable part has a first optical element and a second optical element, and the holes includes a first hole, a second hole, and a third hole, wherein the first hole is larger than the second and third holes, and when the driving mechanism is in the closed state, the first hole and the first and second optical elements partially overlap when viewed in a vertical direction.

2. The driving mechanism as claimed in claim 1, wherein the driving assembly has a coil and a magnet received in the fixed part, and when a current signal is applied to the coil, the coil and the magnet generate an electromagnetic force to impel the movable part relative to the fixed part.

3. The driving mechanism as claimed in claim 2, further comprising a circuit board, a bobbin, and a plurality of conductive terminals, wherein the coil is wound on the bobbin, and the conductive terminals are disposed on the bobbin for electrically connecting the coil to the circuit board.

4. The driving mechanism as claimed in claim 2, further comprising a rotary member, wherein the magnet is disposed on the rotary member, and when the current signal is applied to the coil, the rotary member is driven by electromagnetic force to rotate relative to the fixed part, and the first and second optical elements are forced by the rotary member to move in opposite directions.

5. The driving mechanism as claimed in claim 4, wherein the driving mechanism has a rectangular structure, and the first and second optical elements are forced to move relative to the fixed part along a long axis of the driving mechanism.

6. The driving mechanism as claimed in claim 5, wherein the length of the first optical element along the long axis is greater than the length of the second optical element along the long axis.

7. The driving mechanism as claimed in claim 4, wherein the first optical element has a first opening, and the second optical element has a second opening, wherein when the driving mechanism is in the open state, the first and second openings are aligned to the second and third holes, and when the driving mechanism is in the closed state, the first, second and third holes are blocked by the first and second optical elements.

8. The driving mechanism as claimed in claim 4, wherein the fixed part has a cover and a base connected to each other, the base has a supporting portion and a rib protruding from the supporting portion, and the rib contacts and supports the first optical element.

9. The driving mechanism as claimed in claim 2, further comprising a bobbin, a first yoke, and a second yoke, wherein the coil is wound on the bobbin, and the first and second yokes both have a J-shaped structure extending through the coil and the bobbin.

10. The driving mechanism as claimed in claim 9, wherein the first yoke has a first main body, a first extending portion, and a first bending portion connected between the first main body and the first extending portion, the first main body extends through the bobbin, and the first extending portion is located adjacent to the magnet.

11. The driving mechanism as claimed in claim 10, wherein the first main body and the first extending portion of the first magnetic yoke are situated at different heights in a vertical direction that is perpendicular to a central axis of the coil.

12. The driving mechanism as claimed in claim 10, wherein the second magnetic yoke has a second main body, a second extending portion, and a second bending portion connected between the second main body and the second extending portion, the second main body extends through the bobbin, and the second extending portion is located adjacent to the magnet.

13. The driving mechanism as claimed in claim 12, wherein the second main body and the second extending portion of the second magnetic yoke are situated at different heights in a vertical direction that is perpendicular to a central axis of the coil.

14. The driving mechanism as claimed in claim 13, wherein the first and second main bodies at least partially overlap when viewed in the vertical direction.

15. The driving mechanism as claimed in claim 12, wherein the first extending portion of the first magnetic yoke and the second extending portion of the second magnetic yoke are situated at the same height in a vertical direction that is perpendicular to a central axis of the coil.

16. The driving mechanism as claimed in claim 9, wherein the fixed part has a supporting portion and a recessed portion connected to each other, the movable part is disposed on the supporting portion, and the rotary member, the magnet, the bobbin, the coil, the first yoke, and the second yoke are accommodated in the recessed portion.

17. The driving mechanism as claimed in claim 16, wherein the recessed portion is lower than a bottom surface of the supporting portion in a vertical direction that is perpendicular to the moving direction of the movable part relative to the fixed part.

18. The driving mechanism as claimed in claim 1, wherein the first optical element has a first opening aligned to the second hole, and the second optical element has a second opening aligned to the third hole when the driving mechanism is in the open state.

19. The driving mechanism as claimed in claim 1, wherein the driving mechanism has a rectangular structure, and the fixed part has a cover and a base connected to each other, wherein the driving assembly is received in the base, the cover has a first slot, and the base has a first hook joined in the first slot, wherein the first slot and the first hook are located on a short side of the driving mechanism.

20. The driving mechanism as claimed in claim 19, wherein the cover further has a second slot, and the base further has a second hook located on a long side of the driving mechanism, wherein the second hook is longer than the first hook in a vertical direction that is perpendicular to the moving direction of the movable part relative to the fixed part.

* * * * *